United States Patent [19]
Sherman et al.

[11] Patent Number: 4,924,729
[45] Date of Patent: May 15, 1990

[54] MULTISPEED POWER TRANSMISSION

[75] Inventors: James F. Sherman, Brighton; Kenneth C. Hauser, Canton, both of Mich.

[73] Assignee: General Motors Corporation, Detroit, Mich.

[21] Appl. No.: 329,217

[22] Filed: Mar. 27, 1989

[51] Int. Cl.$^5$ .............................................. F16H 37/00
[52] U.S. Cl. ..................................... 475/207; 475/285
[58] Field of Search ................................... 74/740, 762

[56] References Cited

U.S. PATENT DOCUMENTS

| | | | | |
|---|---|---|---|---|
| 2,204,779 | 6/1940 | Swennes | 74/740 | X |
| 2,719,442 | 10/1955 | O'Leary | 74/740 | X |
| 3,578,117 | 5/1971 | Ahlen | 74/740 | X |
| 3,673,890 | 7/1972 | Crooks | 74/740 | X |
| 4,788,887 | 12/1988 | Lepelletier | 74/762 | X |

Primary Examiner—Dirk Wright
Attorney, Agent, or Firm—Donald F. Scherer

[57] ABSTRACT

A multispeed transmission has a planetary gear arrangement and two pair of countershaft gears. The countershaft gears are drivingly connectible between the output of the planetary gear arrangement and the output shaft of the transmission. One pair of the countershaft gears provides a rotating reaction for the planetary during one speed ratio and a reduction ratio during at least one other speed ratio. The other pair of countershaft gears provides a reduction ratio from the planetary during the one speed ratio and a single reduction ratio between the transmission input and the transmission output in at least one other speed ratio. The planetary transmission is controlled by clutches and brakes to establish a reduction ratio, a direct drive and an overdrive ratio.

3 Claims, 2 Drawing Sheets

MULTISPEED POWER TRANSMISSION

BACKGROUND OF THE INVENTION

This invention relates to multispeed transmissions and more particularly to such transmissions having both a planetary gear arrangement and a countershaft gear arrangement in combination to provide a plurality of speed ratios.

SUMMARY OF THE INVENTION

The present invention has a planetary gear arrangement disposed between the transmission input and output members, which planetary gear arrangement is controlled by a plurality of selectively engageable clutches and brakes to establish a plurality of speed ratios including a reduction drive, a direct drive, an overdrive and a reverse drive. The planetary ratios are combined with two pairs of countershaft gear sets to provide at least four forward speed ratios and a reverse speed ratio between the transmission input and output members. The countershaft gear sets are disposed between the transmission input and output members. The input member is preferably a torque converter and the output member is a gear differential.

The countershaft gear sets alone or in combination are effective in each of the speed ratios so that by changing only the countershaft gear sets, the overall transmission ratio coverage and each individual ratio can be changed. This provides a wide latitude in which the basic planetary gear arrangement, transmission housing, shafting and controls can be used in power transmissions mechanisms. The countershaft gears are the least costly to produce and assemble. Therefore, the changeover cost from one transmission to another is kept to a minimum.

It is therefore an object of this invention to provide an improved multispeed transmission wherein a planetary gear arrangement is coupled with two pairs of countershaft gear sets to establish, through the use of selectively engageable clutches and brakes, a plurality of speed ratios between the transmission input and output members.

It is another object of this invention to provide an improved multispeed transmission having a simple planetary gear arrangement and a pair of countershaft gear sets connectable between the transmission input member and an output differential to provide at least four forward speeds and a reverse speed, with at least one or the other of the countershaft gear sets being included in the transmission path during each speed ratio and one of the countershaft gear sets providing a reaction while the other countershaft gear set provides a drive path during one speed ratio.

These and other objects and advantages of the present invention will be more apparent from the following description and drawings.

DESCRIPTION OF THE PREFERRED EMBODIMENT

Figure 1:
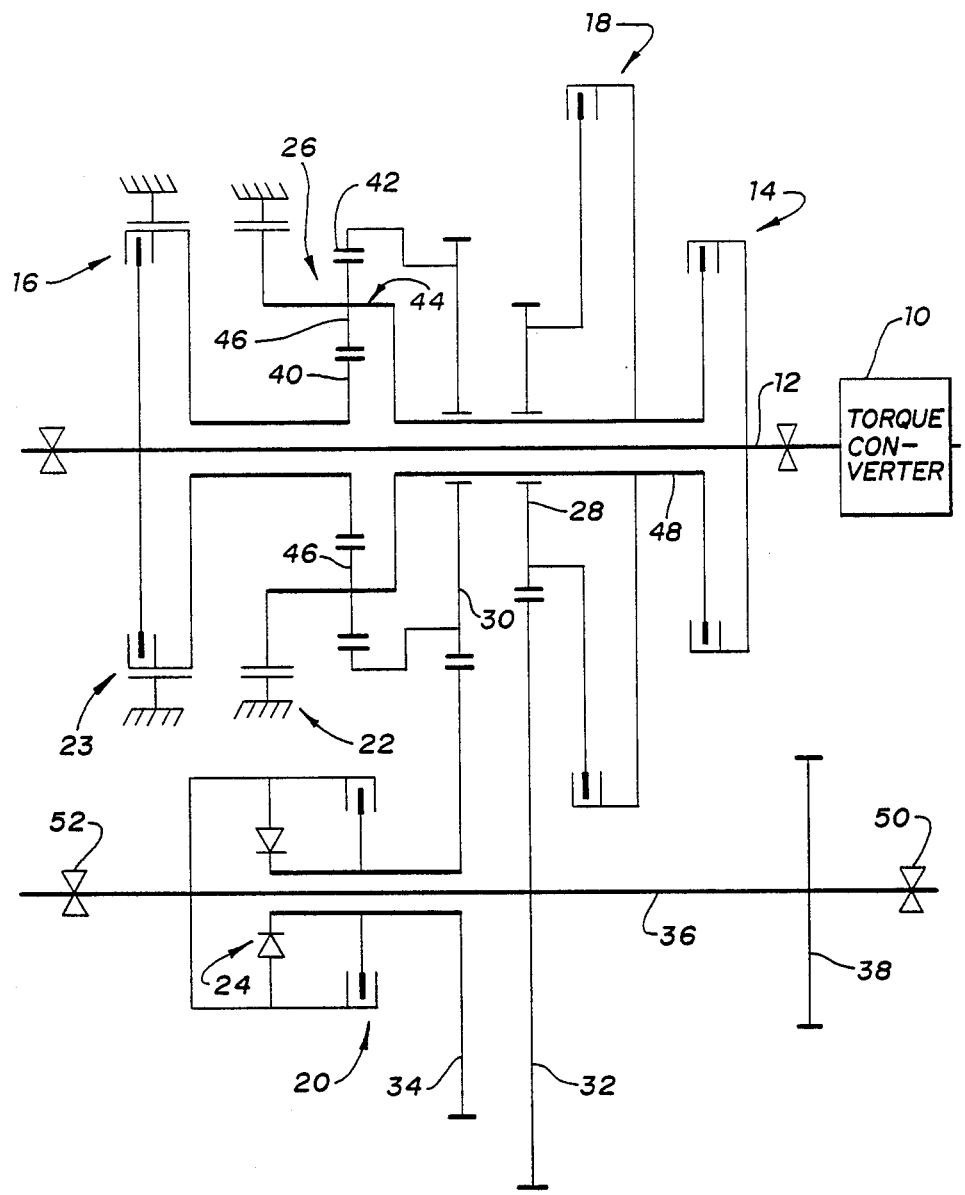
FIG. 1 is a schematic representation of a gearing arrangement incorporating the present invention.

Referring to the drawings, there is seen in FIG. 1 a schematic representation of a power transmission including a conventional torque converter 10 adapted to be driven by a power input shaft connected with an engine, not shown.

The transmission also includes an input shaft 12, a pair of input clutch assemblies 14 and 16, a pair of output clutch assemblies 18 and 20, a pair of brake assemblies 22 and 23, a one-way clutch mechanism 24, a simple planetary gear set 26, a pair of drive or ratio gears 28 and 30, a pair of driven or ratio gears 32 and 34, a transmission output shaft 36 and a power output gear 38.

The planetary gear arrangement 26 includes a sun gear 40, a ring gear 42 and a planet carrier assembly 44. The planet carrier assembly 44 includes a plurality of pinion gears 46 meshing with the sun gear 40 and ring gear 42. The sun gear 40 is drivingly connected to the input clutch 16 which is also drivingly connected to the input shaft 12. Engagement of the clutch 16 will cause the sun gear 40 to be driven by the input shaft 12. The sun gear 40 is also operatively connected with the brake assembly 23, such that upon engagement of the brake 23, the sun gear 40 will be held stationary.

The carrier assembly 44 is operatively connected with the input clutch assembly 14 which provides a drive connection between the input shaft 12 and the carrier assembly 44 when engaged. The carrier 44 is also operatively connected with the brake assembly 22 which will hold the carrier assembly 44 stationary when engaged. The carrier assembly 44 is also operatively connected with the output clutch assembly 18 which, when engaged, will provide a drive connection between the carrier assembly 44 and the drive gear 28. The ring gear 42 is continuously drivingly connected with the drive gear 30.

The driven gear 32 meshes with drive gear 28 and is drivingly connected with the output shaft 36. The driven gear 34 meshes with the drive gear 30 and is operatively connected with the output clutch assembly 20 and the one-way clutch assembly 24. When the clutch assembly 20 is engaged, the driven gear 34 will be drivingly connected with the output shaft 36. The one-way clutch 24 is operative to interconnect the driven gear 34 and the output shaft 36 when the driven gear 34 is rotating slower than the output shaft 36.

The gear arrangement shown in FIG. 1 is operable to establish four forward speed ratios and a reverse speed ratio between the power input member, torque converter 10, and the power output gear 38 through selective engagement of the clutches and brakes.

To establish the first and lowest forward speed ratio, clutch assemblies 16 and 18 are engaged. With the engagement of these clutches, the sun gear 40 is driven at engine speed and the drive gear 28 is connected with the carrier assembly 44. When the sun gear 40 is driven forwardly by the engine, the ring gear 42 will attempt to rotate in the reverse direction. Due to the connection of the one-way clutch assembly 24, the gears 30 and 34 will also attempt to rotate in the reverse direction. The carrier 44 will drive the gear 28 and driven gear 32 in the forward direction.

By controlling the number of teeth on the various gear members, and therefore the diameters of the various gear members, the torque at the driven gear 32 will be greater than the torque at the driven gear 34 and therefore the output shaft 36 will rotate in the forward direction. The ring gear 42, drive gear 30 and driven gear 34 will establish a rotating reaction within the gearing arrangement. These gears (42, 30, 34) will be driven forwardly by the output shaft 36 and will transmit regenerated power through the gear assembly.

To establish the second speed ratio, the input clutch assembly 14 is engaged while the clutch assemblies 16 and 18 remain engaged. With the clutch assembly 14 engaged, the carrier assembly 44 is driven in the forward direction at the speed of the input shaft 12. Since both the sun gear 40 and carrier assembly 44 are rotating in the forward direction, the ring gear 42 will also rotate in the forward direction.

The drive gear 28 is also rotated in the forward direction and will transmit torque from the engaged output clutch 18 and engaged input clutch 14 through input shaft 12 directly to the driven gear 32 and therefore output shaft 36. Since the ring gear 42 is driven in the forward direction as engine speed, the driven gear 34, due to the ratio of gears 30, 34, will rotate forwardly at a speed greater than the output shaft 36. The one-way clutch assembly 24 will permit the driven gear 34 to overrun the output shaft 36. The speed ratio in second gear is determined by the number of teeth on the drive gear 28 and the driven gear 32.

To establish the third speed ratio, the output clutch 18 is disengaged while the output clutch 20 is engaged. The engagement of clutch 20 connects the driven gear 34 to the output shaft 36 for co-rotation therewith. The disengagement of output clutch 18 permits the drive gear 28 to rotate freely. Since the input clutches 14 and 16 are both engaged, the planetary gear arrangement 26 is driven as a unitary package and therefore the drive gear 30 is rotated at the speed of the input shaft 12. The speed ratio in the third forward gear is determined by the number of teeth on the drive gear 30 and the driven gear 34.

The fourth forward speed ratio is established through the disengagement of input clutch 16 and the engagement of brake assembly 23. Brake assembly 23 causes the sun gear 40 to be held stationary such that the ring gear 42 is overdriven; i.e., rotates faster than the input shaft 12.

Since the clutch 20 remains engaged in fourth gear, the output shaft 36 is driven by the ratio gear 34. The speed ratio in the fourth gear is determined by the overdrive ratio of the planetary gear assembly 26 and the gear ratio between the drive gear 30 and driven gear 34.

The reverse gear ratio is established from a neutral condition by engaging the input clutch assembly 16, the brake assembly 22 and the output clutch assembly 20. When the carrier assembly 44 is held stationary by the brake 22 and the sun gear 40 is rotated forwardly by the input shaft 12, the ring gear 42 will rotate in a reverse direction at a speed ratio determined by the number of teeth on the sun gear 40, ring gear 42, drive gear 30 and driven gear 34.

The drive gear 30 and driven gear 34 will be rotated by the ring gear 42 and since the clutch 20 is engaged, the output shaft 36 will be rotated in the reverse direction that is opposite to the direction of rotation of the input shaft 12. The overall reverse ratio between the input shaft 12 and output shaft 36 is determined by the reverse ratio of the planetary gear arrangement 26 and the drive ratios between the gears 30 and 34.

The following is a chart of the number of teeth on each gear and the gear ratios provided by the selective engagement of the various clutches and brakes in an exemplary embodiment of the invention.

| Gears | Number of Teeth |
| --- | --- |
| Sun gear 40 | 30 |
| Ring gear 42 | 70 |
| Drive gear 28 | 32 |
| Driven gear 32 | 68 |
| Drive gear 30 | 43 |
| Driven gear 34 | 57 |

The first gear ratio is 3.99; the second gear ratio is 2.125; the third gear ratio is 1.325; the fourth gear ratio is 0.928; and the reverse ratio is 3.093. The overall ratio speed coverage provided in the forward speed ratios is 4.3.

From the above chart, it should be appreciated that the total tooth count of gears 28 and 32; i.e. 100 teeth, is equal to the total tooth count of gears 30 and 34; i.e., 100 teeth. This is true because the distance between the axes (input shaft 12, output shaft 36) remains equal and therefore the sum of the diameters of meshing gears rotating on these axes must be a constant number.

From the description of the drive ratios, it should be appreciated that the gears 28, 30, 32 and 34 are utilized in each of the drive ratios. Therefore, changing the number of teeth of each gear within a pair will affect at least two gear ratios. For example, if either pair of gears 28, 32 or 30, 34 is changed, the first gear ratio will be affected. If the diameter ratio of gears 28 and 30 is changed, the second forward gear ratio will be affected. If the diameter ratio of the gears 30 and 34 is changed, the third, fourth and reverse gear ratios will be affected. A change in the diameter ratio of the gears must be made within limits determined by the centerline distance between the shafts 12 and 36.

Figure 2:
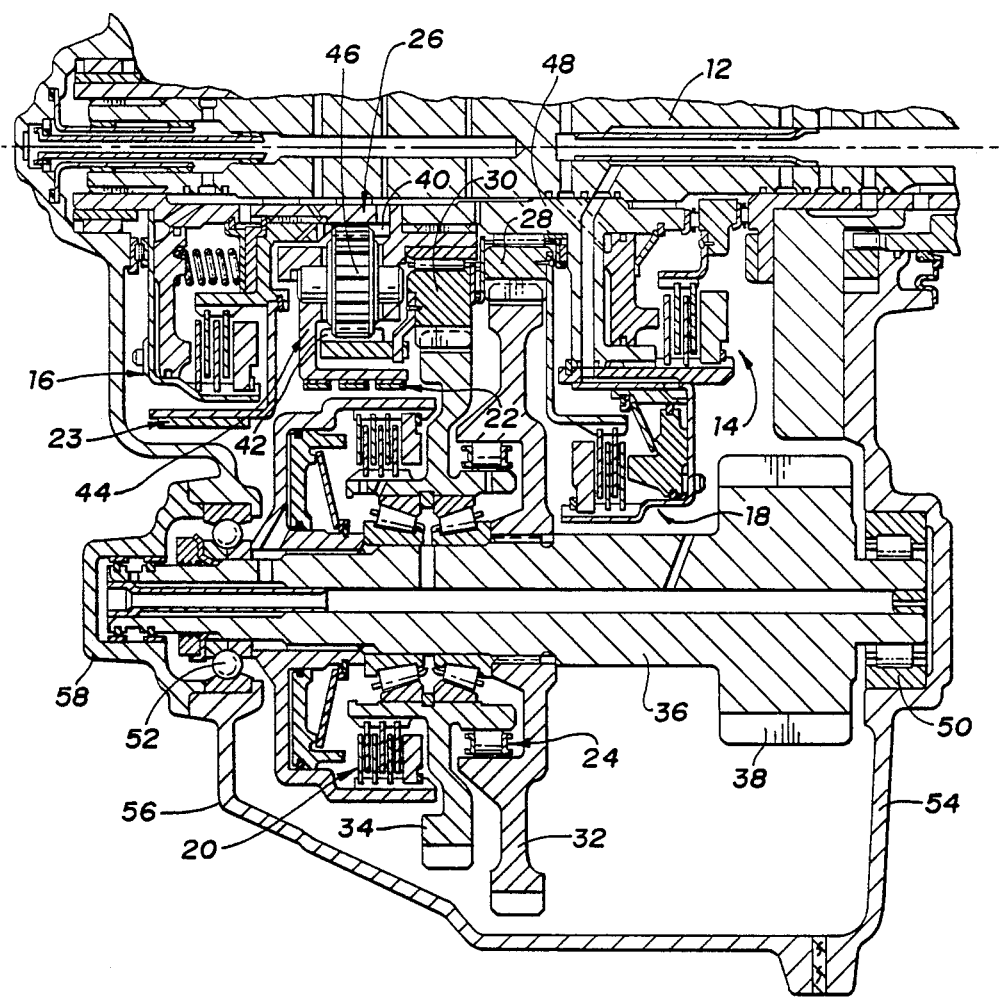
FIG. 2 is a sectional elevational view of a portion of a transmission assembly incorporating the present invention.

FIG. 2 is a partial cross section of a transmission assembly incorporating the schematic arrangement shown in FIG. 1. For simplicity, each gear member is given the same identifying character as was used for FIG. 1, as are the clutch assemblies, brake assemblies and shaft members.

The brake assemblies 22 and 23 may be conventional band type, as shown, or multiple disc type brakes, both of which are engaged in a well known manner through actuation of a servo motor. The clutches 14, 16, 18 and 20 are multiple disc type clutches, each engaged by a fluid operated piston.

Gear 32 is splined to the output shaft 36 while the gear 34 is rotatably supported on bearings on the output shaft 36. The one-way clutch assembly 24 is disposed between the gears 32 and 34 which effectively places the one-way clutch assembly 24 between the driven gear 34 and the output shaft 36.

The drive gear 28 is rotatably supported on a hub 48 which is a part of the clutch assembly 14 which is drivingly connected with the carrier assembly 44. The drive gear 30 is rotatably supported on a portion of the carrier assembly 44 by a bearing member. The output shaft 36 is rotatably supported on bearings 50 and 52 which are secured in an end cover 54 and a transmission housing 56, respectively. The input shaft 12 and output shaft 36 are constructed such that a plurality of clutch feed paths and lubrication flow paths are provided within the transmission assembly. Fluid flow through the output shaft 36 takes place via an end cap 58 through a plurality of passage connections therewith which are not shown.

It should be appreciated from FIG. 2 that none of the ratio gears 28 through 34 are rigidly secured, that is, formed integral with their respective rotating support members. Thus, the gear assemblies can be readily changed to provide specific gear ratios for transmission assemblies designed to operate under certain known conditions. If it is desirable to have maximum torque output for the vehicle, the gear ratios are changed such that maximum torque transmission from the engine will occur. If maximum speed is the criterion, then, of course, the gear ratios are changed in the opposite direction.

The transmission construction makes it quite simple to affect ratio changes from one assembly to the next, and accordingly, provides a great deal of flexibility within the transmission assembly.

The embodiments of the invention in which an exclusive property or privilege is claimed are defined as follows:

1. A multispeed power transmission comprising: input drive means for delivering power to said transmission; output driven means for delivering power from said transmission; an input shaft drivingly connected with said input drive means; a planetary gear means mounted coaxial with said input shaft and having a plurality of members including a sun gear member, a ring gear member, a carrier member and pinion gears rotatably mounted on said carrier member in meshing relation with said sun and ring gears; first drive gear means mounted for rotation coaxial with said input shaft and being continuously connected with a first member of said planetary gear means; second drive gear means mounted for rotation coaxial with said input shaft; an output shaft mounted for rotation on an axis parallel with said input shaft; first driven gear means rotatably mounted on said output shaft and meshing with said first drive gear means; second driven gear means mounted on said output shaft and meshing with said second drive gear means; first selectively engageable friction drive establishing means for connecting a second member of said planetary gear means with said input shaft; second selectively engageable friction drive establishing means for connecting a third of said members of said planetary gear means with said input shaft; third selectively engageable friction drive establishing means for connecting said second drive gear means with said third member of said planetary gear means; fourth selectively engageable friction drive establishing means for connecting said first driven gear with said output shaft; and fifth and sixth selectively engageable friction drive establishing means for establishing said second member and said third member of said planetary gear means respectively as reaction members in said transmission; said friction drive establishing means being selected to establish four forward speed ratios and one reverse speed ratio between said input and output means; said first drive and driven gears cooperating with said planetary gear means to establish a reaction therefore during one forward speed ratio.

2. A multispeed power transmission comprising: input drive means for delivering power to said transmission; output driven means for delivering power from said transmission; an input shaft drivingly connected with said input drive means; a planetary gear means mounted with coaxial with said input shaft and having a plurality of members including a sun gear member, a ring gear member, a carrier member and pinion gears rotatably mounted on said carrier member in meshing relation with said sun and ring gears; first drive gear means mounted for rotation coaxial with said input shaft and being continuously connected with said ring gear member of said planetary gear means; second drive gear means mounted for rotation coaxial with said input shaft; an output shaft mounted for rotation on an axis parallel with said input shaft; first driven gear means rotatably mounted on said output shaft and meshing with said first drive gear means; second driven gear means mounted on said output shaft and meshing with said second drive gear means; first selectively engageable friction drive establishing means for connecting said sun gear member of said planetary gear means with said input shaft; second selectively engageable friction drive establishing means for connecting said carrier member of said planetary gear means with said input shaft; third selectively engageable friction drive establishing means for connecting said second drive gear means with said carrier member of said planetary gear means; fourth selectively engageable friction drive establishing means for connecting said first driven gear with said output shaft; and fifth and sixth selectively engageable friction drive establishing means for establishing said sun gear member and said carrier member of said planetary gear means respectively as reaction members in said transmission; said friction drive establishing means being selected to establish four forward speed ratios and one reverse speed ratio between said input and output means; said first drive and driven gears cooperating with said planetary gear means to establish a reaction therefore during one forward speed ratio.

3. A multispeed power transmission comprising: input drive means for delivering power to said transmission; output driven means for delivering power from said transmission; an input shaft drivingly connected with said input drive means; a planetary gear means mounted coaxial with said input shaft and having a plurality of members; first drive gear means mounted for rotation coaxial with said input shaft and being continuously connected with a first member of said planetary gear means; second drive gear means mounted for rotation coaxial with said input shaft; an output shaft mounted for rotation on an axis parallel with said input shaft; first driven gear means rotatably mounted on said output shaft and meshing with said first drive gear means; second driven gear means mounted on said output shaft and meshing with said second drive gear means; first selectively engageable friction drive establishing means for connecting a second member of said planetary gear means with said input shaft; second selectively engageable friction drive establishing means for connecting a third of said members of said planetary gear means with said input shaft; third selectively engageable friction drive establishing means for connecting said second drive gear means with said third member of said planetary gear means; fourth selectively engageable friction drive establishing means for connecting said first driven gear with said output shaft; and fifth and sixth selectively engageable friction drive establishing means for establishing said second member and said third member of said planetary gear means respectively as reaction members in said transmission; said friction drive establishing means being selected to establish four forward speed ratios and one reverse speed ratio between said input and output means; said first drive and driven gears cooperating with said planetary gear means to establish a reaction therefore during one forward speed ratio.

* * * * *